US010726488B2

(12) United States Patent
Schoos et al.

(10) Patent No.: US 10,726,488 B2
(45) Date of Patent: Jul. 28, 2020

(54) SYSTEM AND METHOD FOR IDENTIFYING AND DISTRIBUTING MATURED POLICY PROCEEDS

(71) Applicant: METROPOLITAN LIFE INSURANCE CO., New York, NY (US)

(72) Inventors: Kathleen Schoos, New York, NY (US); Debra Cruz, Mount Vernon, NY (US); Lawrence Vranka, New York, NY (US)

(73) Assignee: Metropolitan Life Insurance Co., New York, NY (US)

( * ) Notice: Subject to any disclaimer, the term of this patent is extended or adjusted under 35 U.S.C. 154(b) by 0 days.

(21) Appl. No.: 14/092,586

(22) Filed: Nov. 27, 2013

(65) Prior Publication Data

US 2014/0324481 A1 Oct. 30, 2014

Related U.S. Application Data

(60) Provisional application No. 61/730,294, filed on Nov. 27, 2012.

(51) Int. Cl.
*G06Q 40/08* (2012.01)
*G06Q 50/00* (2012.01)
*G06Q 30/02* (2012.01)

(52) U.S. Cl.
CPC ......... *G06Q 40/08* (2013.01); *G06Q 30/0201* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2003/0065539 A1* | 4/2003 | Kay | 705/4 |
| 2004/0117654 A1* | 6/2004 | Feldman et al. | 713/201 |
| 2011/0072043 A1* | 3/2011 | Wood | G06Q 40/08 |
| | | | 707/769 |
| 2011/0161167 A1* | 6/2011 | Jallapuram | 705/14.49 |

* cited by examiner

*Primary Examiner* — Joseph W. King
(74) *Attorney, Agent, or Firm* — Troutman Sanders LLP

(57) ABSTRACT

A computer-implemented method and system is disclosed for identifying beneficiaries of matured insurance policies. In a preferred embodiment, the invention will utilize one or more websites, such as social media websites, to allow customers, family members, and other beneficiaries to search for and receive information about unclaimed matured policy proceeds. Optionally, the users may also search for and receive information related to in force policies. In cases where the insured is living, the invention may be utilized to update address and social security number records, enabling more effective policy administration and customer service going forward. Also provided is an automated system for distributing the matured policy proceeds to the identified beneficiary.

5 Claims, 5 Drawing Sheets

SYSTEM AND METHOD FOR IDENTIFYING AND DISTRIBUTING MATURED POLICY PROCEEDS

STATEMENT OF RELATED CASES

The present application claims the priority of Provisional Application 61/730,294, filed on Nov. 27, 2012, the contents of which are incorporated by reference as if restated in full.

BACKGROUND

While most policy holders apply for benefits upon accrued events associated with the insurance policy, such as death or disability, a surprising number of policies remain unclaimed. There has been a long history of insurance companies taking steps to locate insurance policyholders and to insure proper payment of benefits. In the late 1980s, for example, MetLife began its original "Family Reunion" program—a ten-year, multi-media campaign to locate "lost" policyholders and to reunite them with their MetLife insurance benefits. This campaign led to reconnections with more than 500,000 policyholders.

Currently there are no automated search capabilities for consumers looking to confirm coverage. Calls and letters are received into the customer call center and administrative offices looking for confirmation of coverage. Policy searches are done manually by looking at the individual administrative systems and/or eService. This results in very low rates of recovery, attenuated and displaced benefits and overall dissatisfaction by consumers with the various companies involved in these important products.

SUMMARY

The present invention is directed to a solution to the above noted problem by providing a computer system that quickly and accurately identifies lost policies—for example, life policies where a death has occurred but no benefits were requested or paid. In a preferred arrangement, a computer system integrates an enhanced front end for developing targeted and easily processed inquiries from policy holders and other system users with a selectively programmed computer system that allows for policy searching—for both active and lapsed policies—on an enhanced, and accurate platform with important security considerations in place for linking to a selectively arranged policy database.

DETAILED DESCRIPTION OF THE DRAWINGS

DETAILS OF A PREFERRED EMBODIMENT

A user interface is provided, for example, via the Insurance Company website (e.g., MetLife.com), allowing a consumer to search for information related to a life insurance policy on themselves or a family member. The requestor will be asked to enter a number of data elements about the insured. Once submitted, a real time match process will take place to see if there is a possible match for that insured. If a possible match is found, the requestor will receive an appropriate message and will be asked to provide his/her contact information, as well as additional supplementary information about the insured (e.g. last known addresses and names of parents, spouse, or children).

In one embodiment, all of the possible matches will be routed to a work queue for validation and/or research by an Insurance Company associate. Replies will be emailed to requestors, taking into account their relationship to the policy and the policy status. In another embodiment, the matched information will automatically be sent to the requestor without manual intervention from an Insurance Company associate. Normal rules related to who has rights to policy information will be utilized. For example, for in force policies where the insured is living, only the policy owner will be given information. For policies where the insured is deceased, the beneficiaries will be contacted with information about how to submit a claim. If no possible match is found, the requestor will receive an appropriate message advising as such.

The Search functionality will strive to identify all in force, lapsed and expired Individual Business life policies associated to an Insured for all companies; or insurance proceeds being held in Unclaimed Funds (Death Claim and Maturity proceeds); and where there is a possible match, to facilitate follow up for confirmation or resolution.

In a preferred embodiment, policies for which proceeds have already been paid will not be searched (Death Claims, Maturities, and Surrenders), nor will policy proceeds already escheated to the state.

Figure 1:
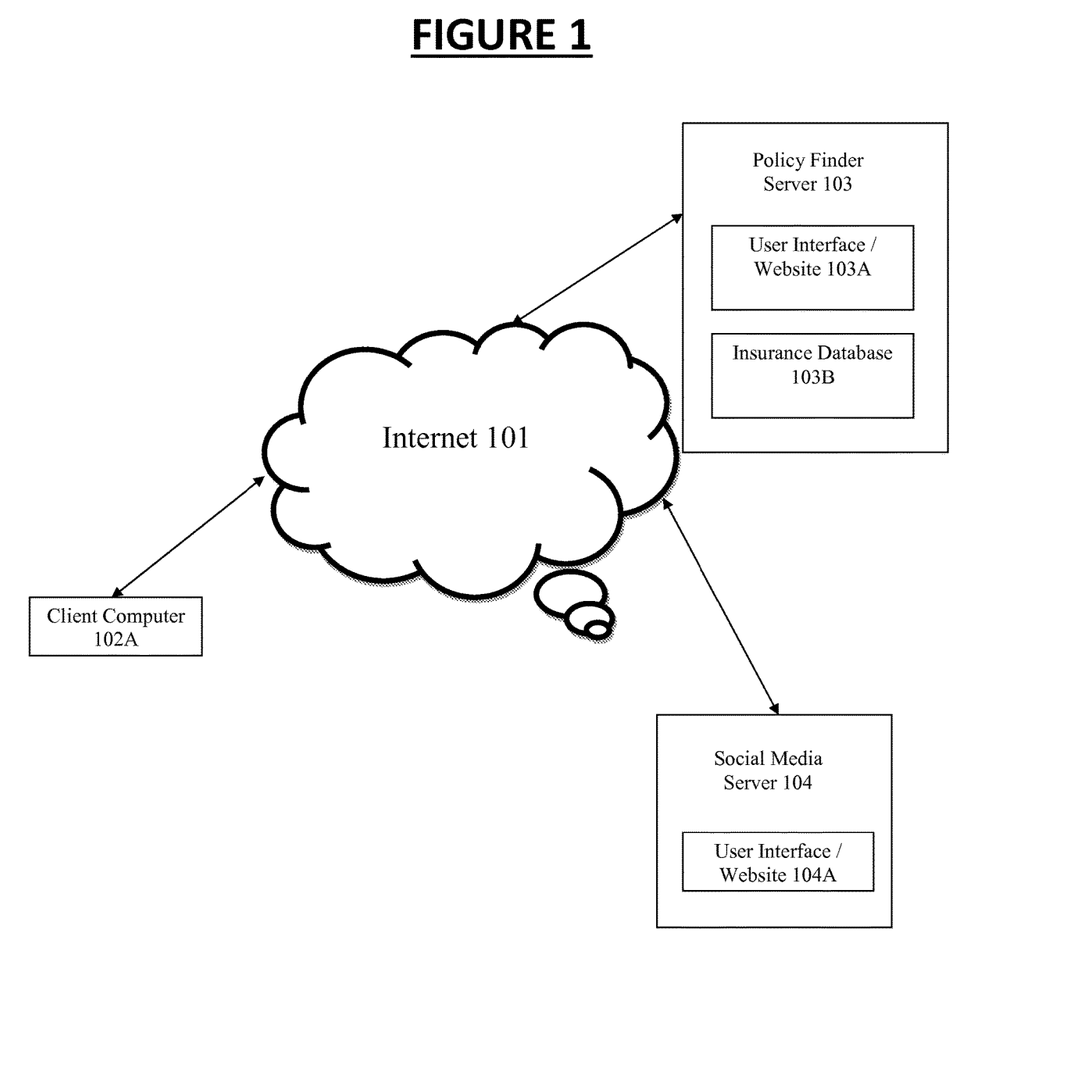
FIG. 1 is a functional block diagram for computer system.

FIG. 1 illustrates an embodiment of the system of the present disclosure for reconnecting policy holders and/or policy beneficiaries with matured policy proceeds. System 100 includes Client Computer 102A operated by a user and containing web browser software allowing the user to access Policy Finder Server 103 via Internet 101. The user is presented with User Interface/Website 103A, which provides a platform for the user to input information, such as date of birth, name, and social security number, into Policy Finder Server 103. Insurance Database 103B comprises one or more databases that contain information related to uncollected matured insurance proceeds, unclaimed insurance funds, and/or in-force insurance policy information. Insurance Database 103B may be local to Policy Finder Server 103 or accessed via network connection. Policy Finder Server 103 queries Insurance Database 103B with the user input information to determine whether the user (or the person associated with the input information) is the beneficiary to any unclaimed matured insurance proceeds, and/or whether the user has any outstanding insurance policies associated with them. If the user is authorized to receive this information, the Policy Finder Server 103 sends this information to Client Computer 102A via Internet 101. Alternatively, the user may attempt to locate outstanding matured benefits or insurance policy information via Internet 101 through User Interface/Website 104A hosted by Social Media Server 104. For example, a Facebook™ or Twitter™ page or "app" sponsored by MetLife, may provide more visibility to potential users. In this example, Social Media Server 104 sends the user input information and request to Policy Finder Server 103 via Internet 101. In a preferred embodiment, the Policy Finder Server 103 will subsequently interact with Client Computer 102A directly as opposed to sending the resulting data to Social Media Server 104.

Figure 2:
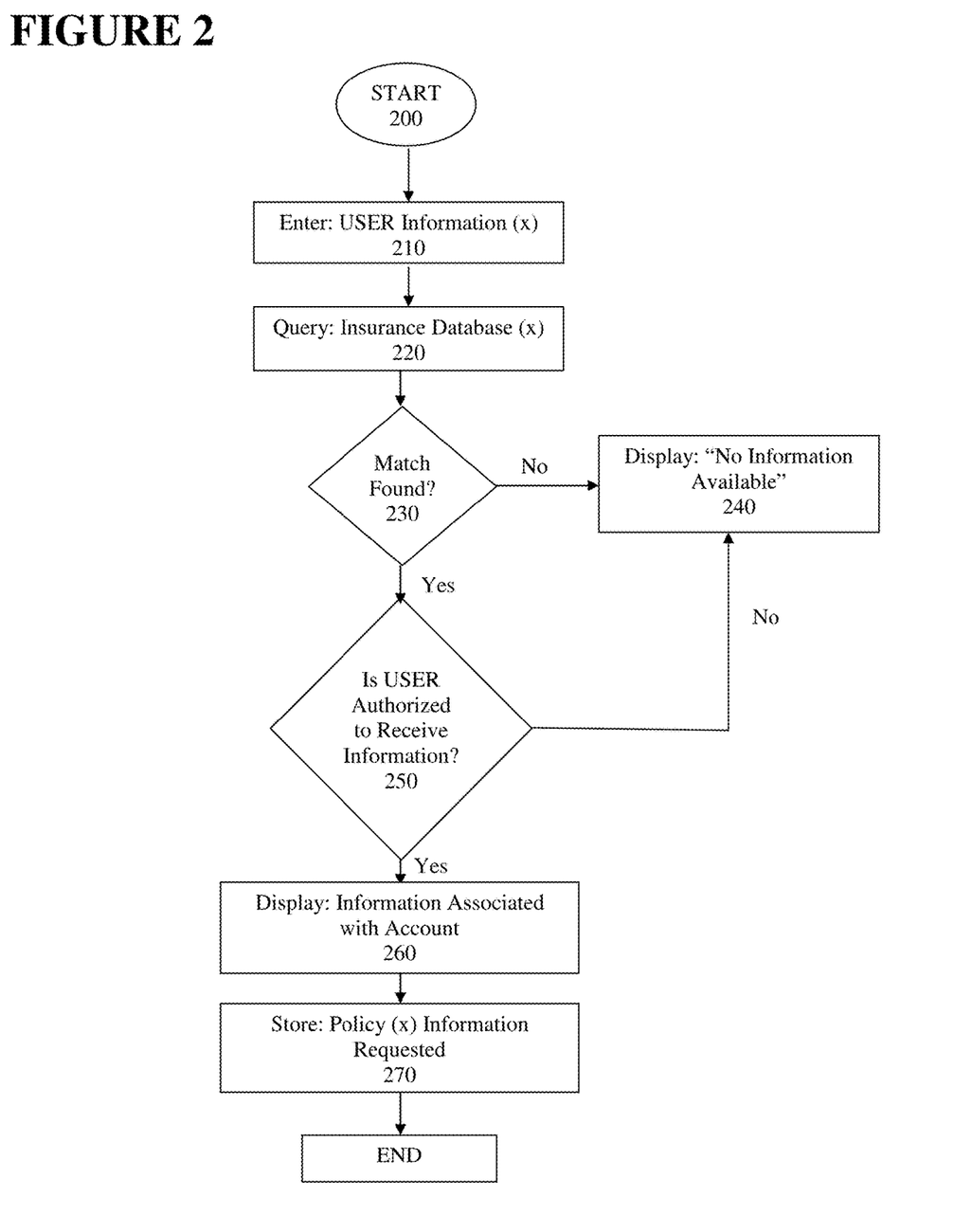
FIG. 2 provides a flow chart for logic according to select system programming.

FIG. 2 describes a high level process flow according to one embodiment of the invention. The process starts at step 200, and then continues to step 210 where a user enters her personal information (such as name, date of birth, and/or social security number). The system then queries the insurance database with the user information, step 220, and determines if there is a match, step 230. If there is no match then the system displays to the user a message indicating that no information is available, step 240. If there is a match, the system determines whether the user is authorized to receive this information, step 250. If the user is not authorized, then the system proceeds to step 240. If the user is authorized, then the system displays information describing the found in-force policy or matured benefits, step 260. The system then stores information related to the query, step 270. This stored information may be used, for example, to follow up with the user and/or effect the distribution of matured funds to the user. The process then ends at step 280.

Figure 3:
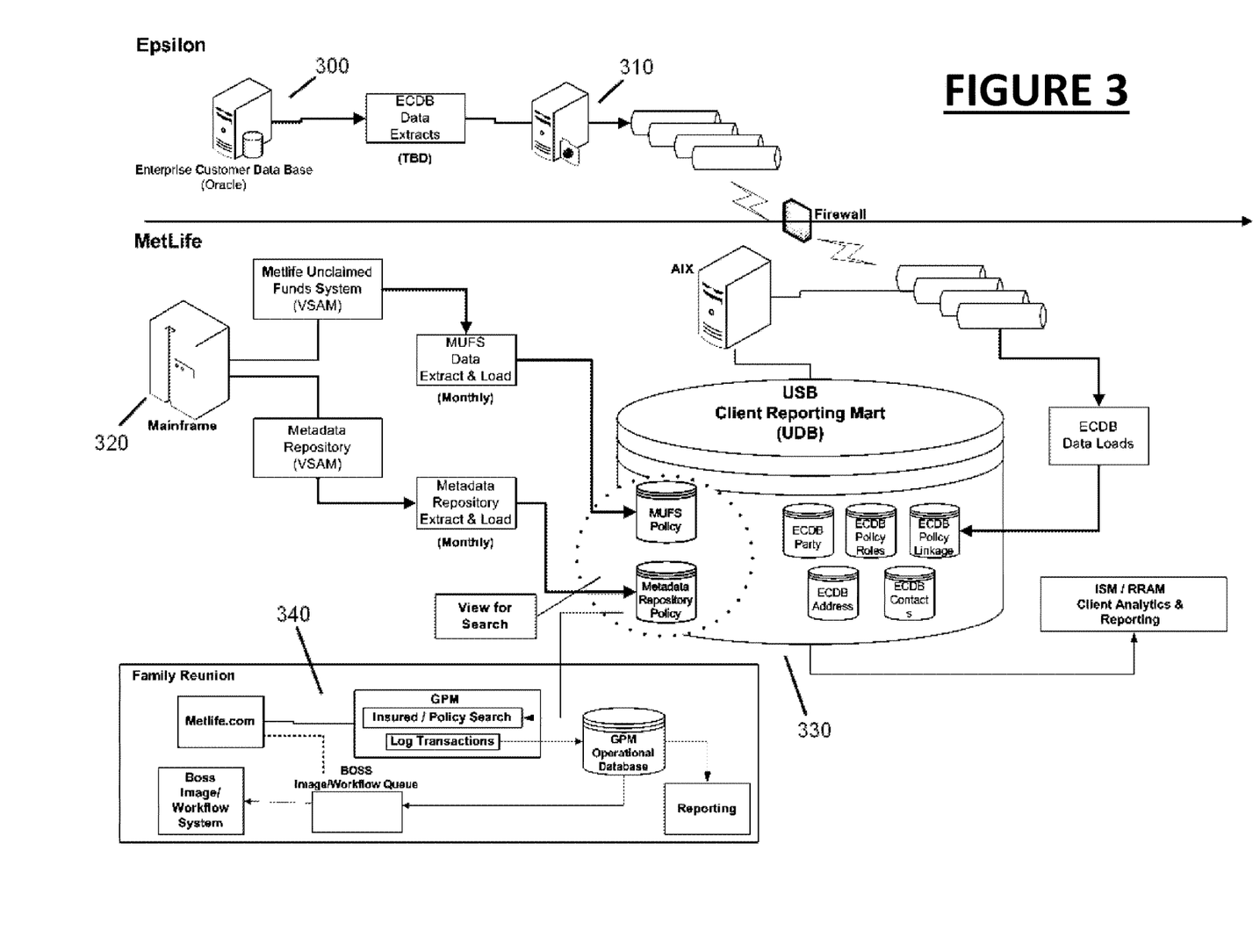
FIG. 3 provides further embellishments on one arrangement.

Turning now to FIG. 3, a further presentation of system architecture and attributes are provided including additional details for the preferred embodiment. In particular, as noted a firewall separates the insurance administrator from various customer accessible portals as illustrated. On the administrator side, a back office mainframe 320 links to the search interface 330 for assessing search requests. In one arrangement, the system interfaces with Family Reunion, block 340.

One aspect of the preferred embodiment is directed to creating access through social media platforms, such as Facebook and LinkedIn, where the system administrator registers a "page" or similar portal on the platform, and then promotes capabilities for using the portal to access policy data—including the existence of lapsed policies. Members of the social network will, for example, "friend" the system administrator, allowing access to that portal; in this way, selected messages and promotions can be targeted to these members based on the details that are available using the social network platform.

Figure 4:
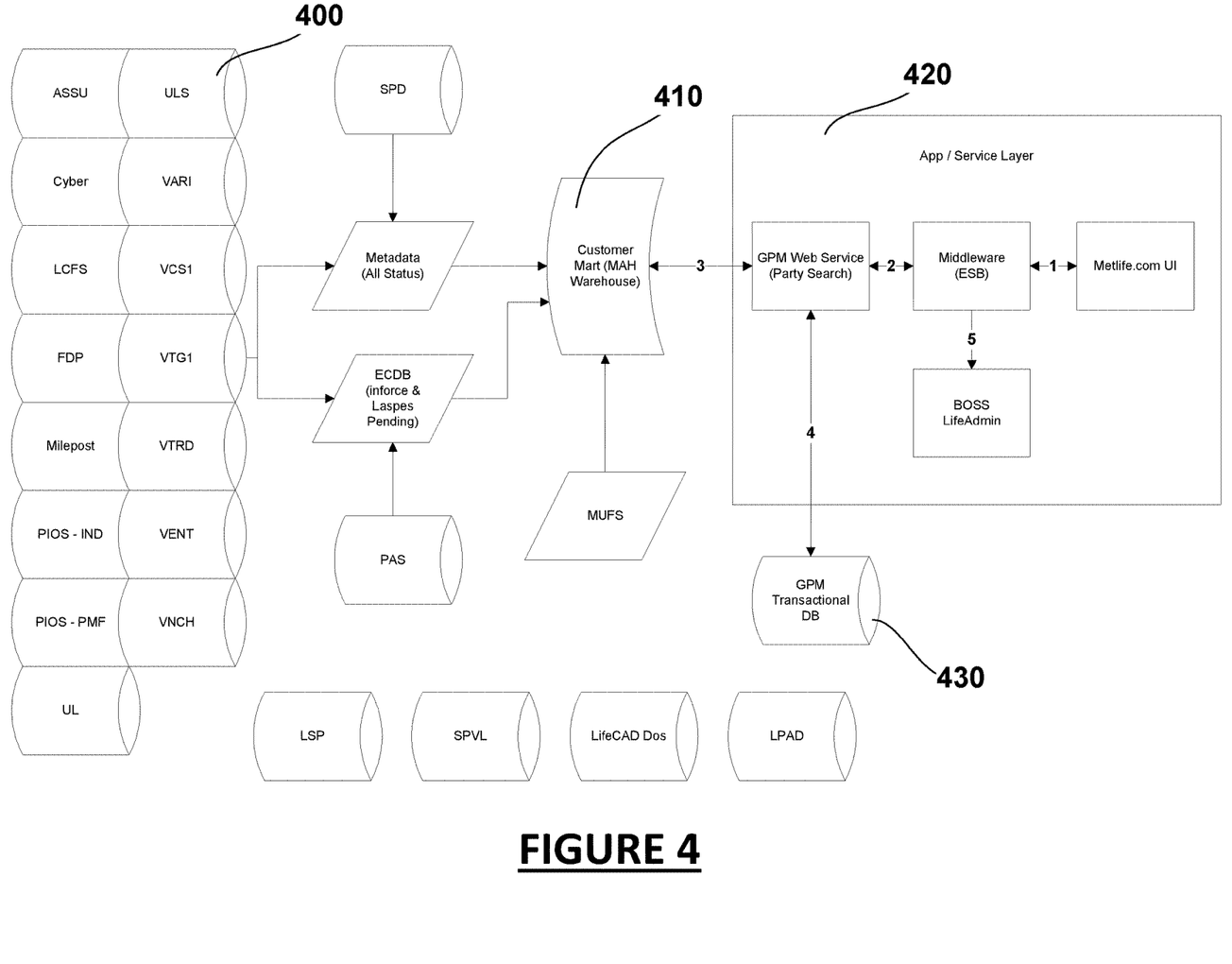
FIG. 4 is a functional block diagram regarding a particular illustrative embodiment of the present invention.

Turning now to FIG. 4, additional details of select aspects of the invention are provided. Block 400 reflects database elements, their interrelationships and their use to support metadata and policy data for enforce and lapsed policies. Customer Support Mart 410 is used as accessible data warehouse for communication to the app/server layer 420.

Figure 5:
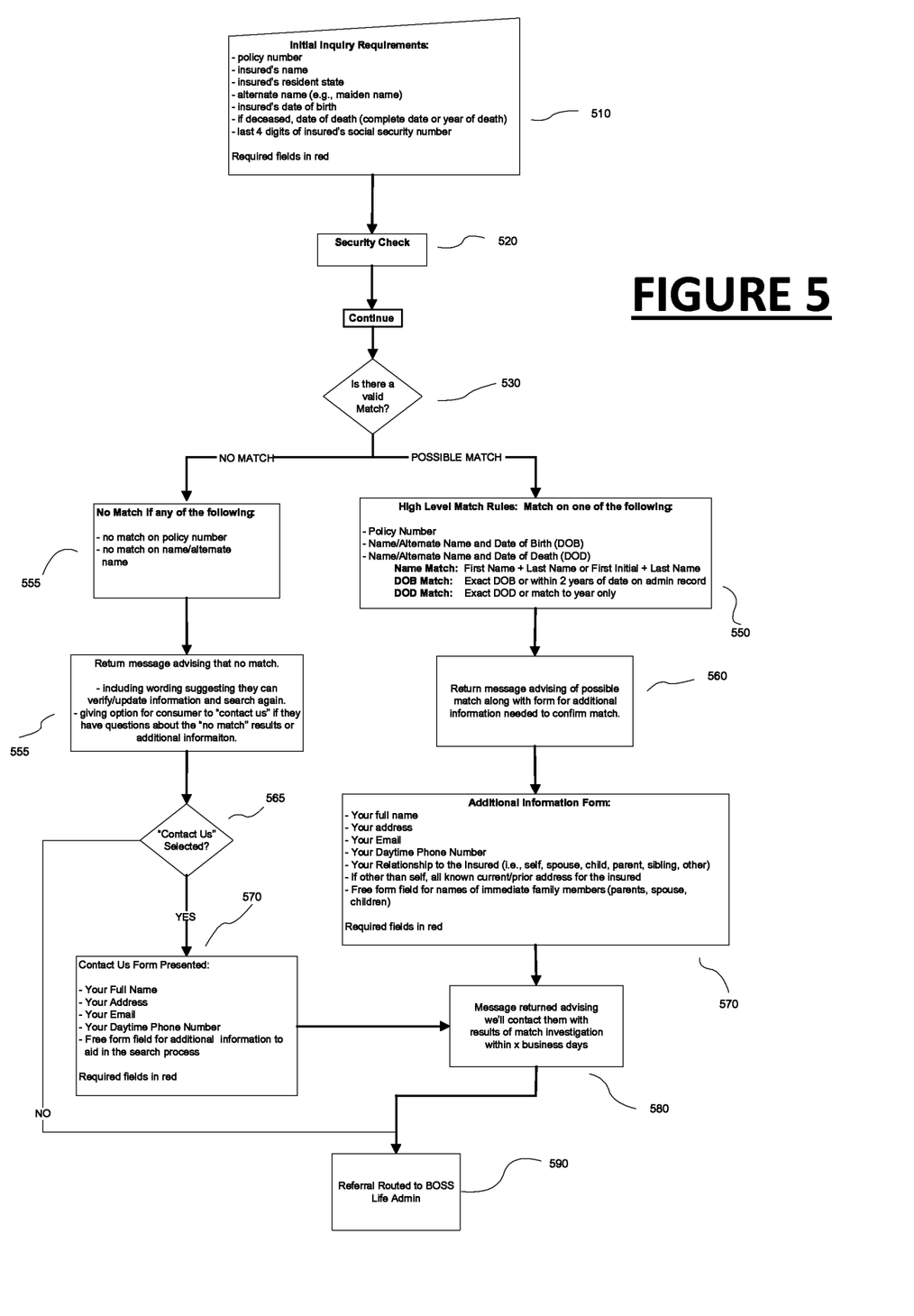
FIG. 5 is a flow chart diagram directed to select aspects of the present invention

Turning now to FIG. 5, a further flowchart regarding operational aspects of the computer system is provided. At block 510, a user enters search parameters for consideration through the system portal. A typical security check is provided at block 520—here a system word entry to frustrate web spiders. At test 530 the system determines if the inquiry is a valid match. If no match, logic branches to the left and to block 540—rejections based on policy number and/or name. At block 550 a return is sent with select options to the user. Test 565 determines if the user selects "contact us"—if yes, logic branches to 570; if no, then logic terminates at block 590—and referral routing.

Continuing with FIG. 5, a preliminary match criteria is provided—with enumerated match values for high level matches. Block 560 provides the return message to the user—and a request for additional information as depicted by block 570. Logic on this branch terminates with a return message to the user, block 580 and final referrals to the BOSS System Administrator 590.

The following sections discuss specific implementations of the invention. These implementations are illustrative and not limiting.

System Assumptions:

| NAME | DESCRIPTION |
| --- | --- |
| Policy Number Format | The various admin systems supporting Individual Business Life products have differing policy number formats. The Business expects the system solution to facilitate matching even if the entered format does not conform to the usual admin system expectation. |
| Customer Experience | The Business expects the system solution to execute the search(es) in a timely fashion to avoid system time-outs and to maximize the customer experience. User experience is highly important. |
| Scalability | Projections for initial volumes estimate approximately 4000-8000 searches per week and 250 phone calls per week. Because these volumes are estimates and because increased awareness could drive the volumes higher sooner than expected the system solution must be able to handle sudden increases and fluctuations in activity while maintaining a positive user experience. In addition, the system solution must be adaptable to expand the scope of the search should the scope of the effort increase in future. |
| iPAS | The iPAS platform does not feed MetaData therefore it will not be included in the initial release of the project, but the gap will have to be closed perhaps with a dot release. |

The following systems will be impacted:

| SYSTEM | FUNCTIONALITY |
| --- | --- |
| Insurance Company website | Provide a User Interface to facilitate the search |
| Business Objects Service Solutions Image & Workflow System (BOSS) | Create cases based on referral from Insurance Company website |
| Enterprise Customer Database (ECDB or MetaData) | Database of Individual Life insurance policies across Individual Business |
| Insurance Unclaimed Funds System (MUFS) | Database of all unclaimed funds from Maturity and Death Claim proceeds |
| Global Party Management System (GPM) | The back end system that will process the search, log the transaction in the GPM Transactional database and provide the details for the BOSS referral |

It is understood, as described below, that the following requirements can be implemented in and by a computer system. For example, the requirements can be embodied in software operable to control a data-processor.

| BUSINESS REQUIREMENT NAME | DESCRIPTION |
|---|---|
| User Interface | Insurance Company website to develop user interface allowing consumers to search for Individual Life insurance policies and unclaimed policy proceeds. |
| Access Vehicles | The consumer should be provided the ability to execute the new search capability through Insurance Company website |
| Awareness and traffic drivers | A Public Relations and Marketing strategy which could include social media to create consumer awareness and drive traffic to the search capability |
| Initial Inquiry Data Elements | The new search function will allow the consumer to enter the following data elements to facilitate the search:<br>Policy number<br>Insured's name (required)<br>Insured's resident state (required)<br>Insured's Date of Birth (required)<br>Insured's alternate name (for example, maiden name)<br>If deceased, Insured's date of death (complete date or year of death)<br>Last 4 digits of Insured's social security number |
| Required Fields | The system should generate an online error message if the required field(s) are not entered:<br>"Missing Required Field(s) + <Missing Field Name(s)>".<br>If multiple required fields are missing each missing field should be identified. |
| Policy Number entry | The system must solve for variations in Policy Number formatting, which varies across administrative systems.<br>Allow for alphanumeric search by policy number.<br>(Ex: 12345678 UM)<br>Allow for search by policy number with or without Suffix. (Ex: 12345678 UM, or 12345678)<br>Search by policy number should not be case-sensitive (Ex: 12345678 UM, 12345678 Um, 12345678 um)<br>Allow for search by policy number and suffix with or without space between policy number suffix (Ex: 12345678 UM or 12345678UM<br>Allow for search by policy number with or without spaces in the policy number (Ex: 123 456 789 UM or 123456789UM)<br>Allow for search by policy number with or without hyphens (Ex: 12-345678 UM, or, 12345678-UM, or 1235678 A- -R or 12345678UM |
| Online Edit | The system should display an online error message if the user enters special characters other than space or hyphen into the policy number field:<br>"Invalid Entry + <highlight invalid data element>" |
| Online Edit | The system should display an online error message if the user fails to enter the minimum number of characters or exceeds the maximum number of characters in the Policy Number field:<br>"Policy number entered must be at least x characters and no more than y characters in length."<br>Business Rule: Minimum # x = 6<br>Business Rule: Maximum # y = 13 |
| Security | The system should include any appropriate security features to reduce or eliminate the possibility of automated mass searches that can negatively impact system performance. |
| Search for matches | The system should search for individual life insurance policies and unclaimed policy proceeds that match the entered data elements.<br>Business Rule: Life insurance policies include those policies with the following policy statuses (note: variations on the policy status verbiage exist based on Admin system):<br>Active statuses:<br>Premium Paying/Active/Inforce(01)<br>Lapse pending or grace<br>Disability Waiver<br>AWB Disability or AWB Death*<br>Reduced Paid Up<br>Fully Paid Up<br>Extended Term<br>Active APO*<br>Death Claim Pending/Death Claim Reported<br>Maturity/Maturity Value Paid<br>Maturity Pending<br>Extended Maturity*<br>Single Premium (04) |

| | |
|---|---|
| | Inforce Unknown (metadata maps specifc admin system statuses to this status)<br>Not Inforce Unknown (metadata maps specific admin system statuses to this status)<br>Inactive statuses<br>Lapsed<br>Expired<br>Purchase Loan<br>Business Rule: Unclaimed policy proceeds include Maturity proceeds and Death Claim proceeds paid into Unclaimed Funds (MUFS) and in an Active or Reported status.<br>*these are new statuses, not yet seen in production. Metadata translations will be determined once the statuses surface in production. |
| No Match(es) Found | The system should return a message stating, "No matches found. You may verify or update the entered information and search again."<br>The system should include a disclaimer with the No Match results |
| No Match Inquiry | The system should provide the ability for the user to Contact Us with a No Match result |
| No Match Inquiry Data Elements | The system should provide the ability for the user to provide contact information:<br>User Name (required)<br>User email Address (required)<br>User Daytime Telephone Number (required)<br>Free form field to allow additional comments/information |
| Required Fields | The system should generate an online error message if the required field(s) are not entered:<br>"Missing Required Field(s) + <Missing Field Name(s)>".<br>If multiple required fields are missing each missing field should be identified. |
| Match(es) Found | The system should return a message stating, "Possible match(es) found. Please complete the Additional Information Form to confirm the match." |
| Disclaimer Message | The system should include the following disclaimers with the search results:<br>For No Match results: "We are making our best effort to perform an automated match against only active/in force Individual Life Insurance policies. You may call 1800 XXX-XXXX for further discussion"<br>For both No Match and Possible Match results: "Our matching efforts do not include funds that have been escheated to the state. You may contact the Insured's or Beneficiary's State's abandoned property listing to determine if unclaimed funds are being held by the state" |
| Generate Online form | The system should provide the ability to enter the Additional Information. |
| Additional Information Form | The system should provide the ability to capture the following additional information data elements:<br>Your Full Name<br>Your Address<br>Your email<br>Your daytime telephone number<br>Your relationship to the Insured (i.e. self, spouse, child, parent, sibling, other) in a dropdown selection<br>All the Insured's last known addresses<br>Free Form field to list names of immediate family members (i.e. parents, spouse, children) |
| Required Fields | The system should generate an online error message if the required field(s) are not entered:<br>"Missing Required Field(s) + <Missing Field Name(s)>".<br>If multiple required fields are missing each missing field should be identified. |
| Confirmation Message | The system should generate an online confirmation (or an email) message, "We will contact you with the results of the match investigation within x business days."<br>Business rule: x = 10 |
| Referral to BOSS | The system should refer a case to BOSS for each search completed. |
| No Match | The system should refer a No Match case to BOSS with all the data entered in the Initial Inquiry. This will enable users to research and respond to subsequent queries from requestors regarding their earlier searches. |
| No Match Inquiry | The system should refer a No Match Inquiry case to BOSS with all the data entered in the Initial Inquiry and all data entered in the Contact Us form. |
| Possible Match | The system should refer a Possible Match case to BOSS with all the data entered in the Initial Inquiry, the Additional |

| | |
|---|---|
| | Information Form, and
When there are 10 possible matches or less the referral should include the policy details for each possible match: policy number, Insured's name, policy status, company, and source of match (Admin or MUFS)
When there are more than 10 possible matches the referral should include only a total count of the number of possible policy matches; do not include policy details.
ECDB or MetaData
The system will identify a match on one of the following as a Possible Match:
Policy number
Insured's Name/Alternate Name and DOB
If there is a match on policy number, there is no need to do additional searches (by name/dob). If there is a match on policy number but the name/DOB does not match, it is still a possible match.
MUFS
The system will identify a match on Insured's Name/Alternate Name only as a Possible Match.
Business Rule for Insured's Name Match (on Name or Alternate Name): First Name + Last Name, or First Initial + Last Name
Business Rule for DOB Match: Exact DOB match, or within a certain number of days from the date on the Admin record.
Note: If there is a match on Insured's Name/Alternate name and DOB but other data such as Resident State does not match, it is still a possible match. |
| No Match | The system will identify a No Match if all of the following conditions apply:
No match on Policy Number
No match on Insured's Name/Alternate Name and DOB
No match on Insured's Name/Alternate Name |
| Data | The operational database data will be updated on a monthly basis for the initial release. |
| Generate Reports | The system will generate reports of Search activity and results on a daily/weekly basis.
Daily reports should be generated at the end of each business day to include all requests in the 24 hour period to 12 midnight Eastern Time.
Weekly reports should be generated at the end of day each Friday and contain a summary of activity for the week (Mon-Fri) |
| Report Recipients | The reports will be sent via email to <report recipients>. |
| Data Elements | The reports should provide the following information:
# of No Match Searches performed during the period
# of No Match Inquiries performed during the period
# of Possible Matches identified during the period
requests received by insured's state of residence
requests received by requestor's state/region |
| Interface with Insurance Company website | To facilitate consumer searches for Individual Life insurance policies or unclaimed policy proceeds the system will interface with Metlife.com to create cases. |
| New Source | BOSS will create a unique Source code to identify work incoming from Insurance Company website |
| No Match | BOSS will create a case for each No Match and it will autoclose the case. |
| No Match data elements | The BOSS case will store and display as an image the data elements entered in Metlife.com in the Initial Inquiry. |
| No Match Inquiry | BOSS will create a case for each No Match Inquiry and route it as a new transaction type (Transaction Name TBD) to the Address Change Senior queue. |
| No Match Inquiry data elements | The BOSS case will store and display as an image the following:
The data elements entered in Metlife.com Initial Inquiry
The data elements entered in the Contact Us form |
| Possible Match | BOSS will create a case for each Possible Match and route it as a new transaction type (Transaction Name TBD) to the Address Change Senior queue. |
| Possible Match data elements | The BOSS case will store and display as an image the following:
The data elements entered in Metlife.com Initial Inquiry
The Additional Information Form
If 10 possible matches or less, the policy number, Insured's name, Insured's residence state, policy status, |

-continued

| | |
|---|---|
| | company (i.e., insurance provider) and source of match (Admin or MUFS) for each possible match. If more than 10 possible matches, the total count of the number of possible policy matches. |
| BOSS Search | The system will provide the ability to search in BOSS for Pending or Completed No Match by capturing insured's first and last name in a searchable field; and Possible Match and No Match Inquiry Cases by capturing the requestor's first and last name in a searchable field. |
| Business Objects Reports | Business Objects will be modified to report on the new source of work. |
| Business Objects Reports | The system must report on the number of cases successful matched from the Possible Match cases. |
| Name Standardization | The system should recognize some common nicknames where the first initial of the proper name and nickname are different, e.g. William/Bill, Elizabeth/Liz/Libby/Betsy, Margaret/Peggy, Rebecca/Becky/Becca, Edward/Ted/Ned. |

| REGULATORY REQUIREMENT NAME | DESCRIPTION |
|---|---|
| Privacy | The system should comply with company's privacy guidelines. |
| Retention | The system should retain search results for the legally prescribed period in the transactional database and in BOSS. |

The invention described above is operational with general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

Components of the inventive computer system may include, but are not limited to, a processing unit, a system memory, and a system bus that couples various system components including the system memory to the processing unit. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system typically includes a variety of non-transitory computer-readable media. Computer-readable media can be any available media that can be accessed by the computer and includes both volatile and nonvolatile media, and removable and non-removable media. By way of example, and not limitation, computer-readable media may comprise computer storage media and communication media. Computer storage media may store information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The computer system may operate in a networked environment using logical connections to one or more remote computers. The remote computer may be a personal computer, a server, a router, a network PC, a peer device or other common network node, and typically includes many or all of the elements described above relative to the computer. The logical connections depicted in include one or more local area networks (LAN) and one or more wide area networks (WAN), but may also include other networks. Such networking environments are commonplace in offices, enterprise-wide computer networks, intranets and the Internet.

For ease of exposition, not every step or element of the present invention is described herein as part of software or computer system, but those skilled in the art will recognize that each step or element may have a corresponding computer system or software component. Such computer systems and/or software components are therefore enabled by describing their corresponding steps or elements (that is, their functionality), and are within the scope of the present invention. In addition, various steps and/or elements of the present invention may be stored in a non-transitory storage medium, and selectively executed by a processor.

The foregoing components of the present invention described as making up the various elements of the invention are intended to be illustrative and not restrictive. Many suitable components that would perform the same or similar functions as the components described are intended to be embraced within the scope of the invention. Such other components can include, for example, components developed after the development of the present invention.

What is claimed is:

1. A computer system for managing a facilitated platform supporting existing insurance policy search operations, comprising:
 a communication platform in a policy finder server interfacing, by an internet network with a social media server, wherein the communication platform includes a registered portal on the social media server presenting a user interface in a web browser on a client computer, the user interface configured to receive a user input of a requestor;
  wherein the user input translates to information including: an inquiry regarding an insurance policy of a life insurance policyholder;
 a first communication port receiving, via the internet network, a first encoded message comprising a translation of the inquiry regarding an active or lapsed life insurance policy where death of the life insurance policyholder has occurred but no benefits were requested or paid;
 an insurance database, in a policy finder server, comprising one or more databases storing information related to a plurality of insurance policies,
  wherein the insurance policy information includes benefit status, policy status and policy privacy rules related to each stored policy;
 a data processor, in the policy finder server, configured to:
  receive, from the social media server, via the internet network, the user input;
  receive, a first identifier, in the user input identifying the life insurance policyholder, from the user interface;
  query the insurance database to determine that there is a match with the first identifier;
  display a first message on the user interface requesting identification of the requestor after the match with the first identifier is found;
  receive a second identifier identifying the requestor from the user interface;
  query the insurance database to determine that there is a match with the second identifier;
  determine that the requestor is a beneficiary to any unclaimed matured insurance proceed of a life insurance policy of the life insurance policyholder based on information stored in the insurance database, the first identifier and the second identifier;
  display a second message on the user interface indicating information of how to submit a claim for the unclaimed matured insurance proceed of the determined life insurance policy of the life insurance policyholder; and
  store data comprising one or more results from the inquiry in a non-transitory storage medium.

2. The system of claim 1 wherein the insurance database is a relational database that comprises historical policy information regarding enforced and lapsed policies accessible using select searching algorithms that interface with a metadata layer.

3. The system of claim 1, wherein the first communication port is part of a communication server operated by a system administrator for processing incoming inquiries.

4. A computer programming method for supporting an insurance policy inquiry engine for select and enhanced database search, said method comprising:
 receiving, by a data processor in a policy finder server, via an internet network, from a social media server, information entered into a user interface by a requestor presented in a form of a website hosted by the social media server, the user interface being provided in a web browser on a client computer accessible by the requestor,
  wherein the information includes: an inquiry regarding an active or lapsed life insurance policy where death of a life insurance policyholder has occurred but no benefits were requested or paid;
 receiving, through a first communication port, a first encoded message comprising a translation of the inquiry regarding the insurance policy;
 storing, by an insurance database in the policy finder server, a plurality of insurance policies, and insurance policy information including benefit status, policy status and policy privacy rules related to each stored policy;
 receiving, by the data processor in the policy finder server, a first identifier identifying the life insurance policyholder from the user interface;
 querying, by the data processor, the insurance database to determine that there is a match with the first identifier;
 displaying, by the data processor, a first message on the user interface requesting identification of the requestor after the match with the first identifier is found;
 receiving, by the data processor, a second identifier identifying the requestor from the user interface;
 querying, by the data processor, the insurance database to determine that there is a match with the second identifier;
 determining, by the data processor, that the requestor is a beneficiary to an unclaimed matured insurance proceed of a life insurance policy of the life insurance policyholder based on information stored in the insurance database, the first identifier and the second identifier;
 displaying a second message on the user interface indicating information of how to submit a claim for the unclaimed matured insurance proceed of the determined life insurance policy of the life insurance policyholder; and
 storing data on a non-transitory storage medium comprising one or more results from the inquiry.

5. The method of claim 4, further comprising accessing a metadata layer associated with a relational database storing information regarding one or more lapsed or in force insurance policies.

* * * * *